United States Patent [19]

Nishino et al.

[11] Patent Number: 4,952,652

[45] Date of Patent: Aug. 28, 1990

[54] UNSATURATED POLYESTER COMPOSITIONS AND MOLDED PRODUCTS THEREFROM

[75] Inventors: Kenichi Nishino; Takashi Shibata, both of Osaka; Sanzi Aoki, Nara; Yasuhiro Mishima, Aichi; Hisayuki Iwai, Aichi; Ken Hatta, Aichi, all of Japan

[73] Assignees: Toyota Jidosha Kabushiki Kaisha, Aichi; Takeda Chemical Industries, Ltd., Osaka, both of Japan

[21] Appl. No.: 232,027

[22] Filed: Aug. 15, 1988

[30] Foreign Application Priority Data

Aug. 25, 1987 [JP] Japan .................. 62-212568

[51] Int. Cl.$^5$ .............................................. C08L 67/06
[52] U.S. Cl. ..................................... 523/522; 525/27; 525/92
[58] Field of Search ................ 525/92, 27; 523/522

[56] References Cited

U.S. PATENT DOCUMENTS

| 4,020,036 | 4/1977 | Smith | 525/92 |
| 4,278,558 | 7/1981 | Smith | 525/193 |

*Primary Examiner*—Patricia Short
*Attorney, Agent, or Firm*—Flehr, Hohbach, Test, Albritton & Herbert

[57] ABSTRACT

Unsaturated polyester compositions which are quickly curable and from which molded products with superior surface quality can be obtained are characterized as being composed of an unsaturated polyester, an olefinic unsaturated monomer, an aromatic vinyl-conjugated diene block copolymer or a hydrogenated aromatic vinyl-conjugated diene block copolymer, a mixture of t-butylperoxy benzoate, t-butylperoxy octoate and 1,1-bis(t-butylperoxy) 3,3,5-trimethyl cyclohexane, and at least one selected from organic compounds of cobalt, copper and manganese.

10 Claims, 1 Drawing Sheet

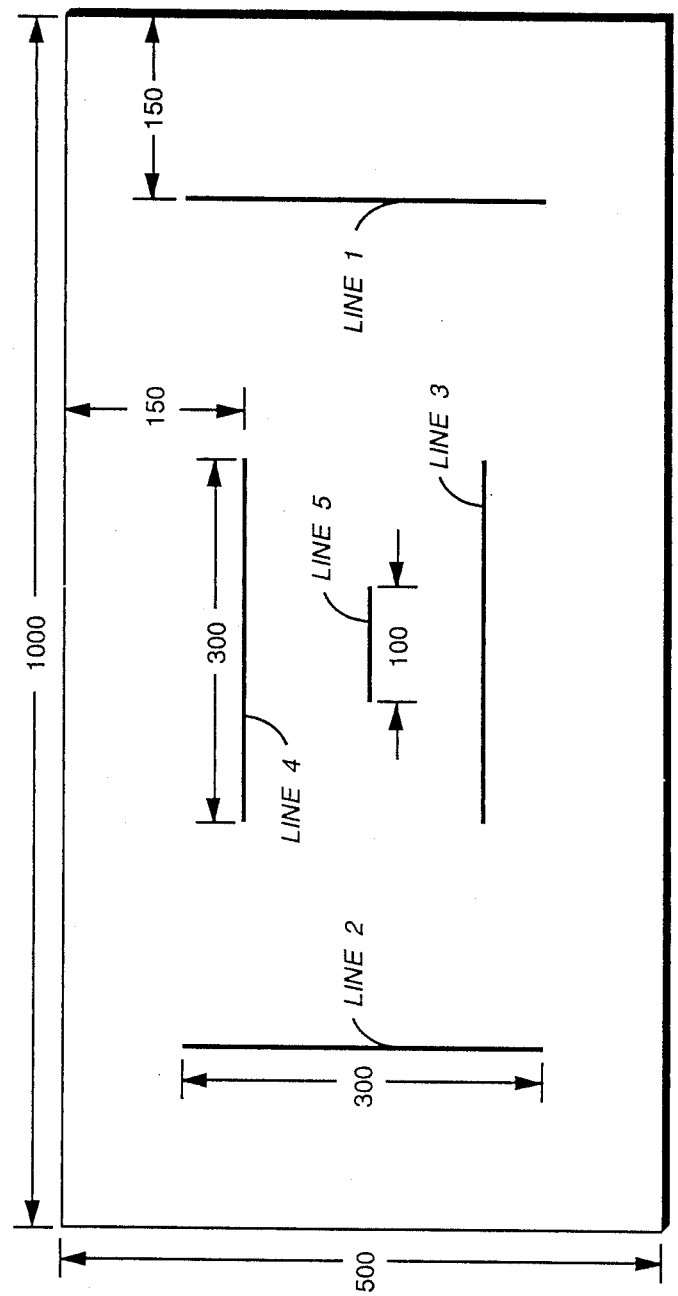

UNSATURATED POLYESTER COMPOSITIONS AND MOLDED PRODUCTS THEREFROM

BACKGROUND OF THE INVENTION

This invention relates to unsaturated polyester compositions which are quickly curable and capable of providing superior surface quality to molded products obtainable therefrom which are useful particularly as exterior body panels and other externally mounted parts of automobiles.

Fiber-reinforced plastics (FRP) using unsaturated polyester resins have superior characteristics not only regarding strength, heat-resistance, water-resistance and resistance against chemicals but also regarding productivity and are used extensively for bathtubs, water tank panels and bathroom sinks. Recently, unsaturated polyester sheet molding compound (SMC) and bulk molding compound (BMC) are becoming recognized as plastic materials for exterior body panels of automobiles and are beginning to be used not only for main exterior panels such as engine hoods, roofs and trunk lids, but also for other exterior parts such as spoilers, air-intakes and rocker panels. In the case of using SMC for exterior body panels of automobiles, high surface quality, ability to be speedily curable and high productivity are particularly required of a sheet molding compound. If the curing speed of SMC can be increased even by seconds, for example, this alone can improve productivity significantly. For this reason, there have been several proposals for quick cure catalysts (such as U.S. Pat. No. 4,278,558), but surface smoothness of SMC tends to be sacrificed if its curability is increased. It has been known to use polymethyl methacrylate, polyvinyl acetate, styrene-butadiene block copolymers, lactone-conjugated diene copolymers, etc. to improve surface smoothness of SMC products (for example, Japanese Patent Publication Tokkai No. 52-148588 and U.S. Pat. No. 4,287,313). Although surface smoothness of SMC products can be improved by using such low profile additives (modifiers), their surface quality is not sufficiently satisfactory even with additives if the curing speed is increased.

SUMMARY OF THE INVENTION

It is therefore an object of the present invention to provide molding materials with balanced curing speed of SMC and surface quality of products.

The present invention has been completed by the present inventors as a result of their diligent studies in view of the above and other objects and is based on their discovery that molded products with superior surface quality can be obtained from compositions which include not only an unsaturated polyester but also specified kinds of unsaturated monomer, block copolymer, catalyst and other compounds.

BRIEF DESCRIPTION OF THE DRAWING

The accompanying Figure which shows a method of measuring surface smoothness is incorporated in and forms a part of the specification and, together with the description, serves to explain the invention.

DETAILED DESCRIPTION OF THE INVENTION

This invention relates firstly to quickly curable unsaturated polyester compositions with high surface quality characterized as containing (a) an unsaturated polyester, (b) an olefinic unsaturated monomer, (c) an aromatic vinyl-conjugated diene block copolymer or a hydrogenated aromatic vinyl-conjugated diene block copolymer, (d) a mixture of t-butylperoxy benzoate, t-butylperoxy octoate and 1,1-bis(t-butylperoxy) 3,3,5-trimethyl cyclohexane, and (e) at least one of organic compounds of cobalt, copper and manganese. This invention relates secondly to products obtainable by curing such unsaturated polyester compositions. Compositions embodying the present invntion not only have superior mechanical strength and resistance against heat, water and chemicals but also such valuable characteristics as surface quality (surface smoothness and paintability) and quick curability (productivity) that are necessary in particular for application to exterior body panels of automobiles. Moreover, sheet molding compounds and bulk molding compounds obtainable from these compositions by adding 10–40% by weight of glass fibers (of length, for example, $\frac{1}{4}$–4 inches) are particularly useful as molding materials for exterior body panels and other external parts of automobiles.

Unsaturated polyesters which may be used in connection with the present invention can be synthesized by condensation of $\alpha,\beta$-olefinic unsaturated dicarboxylic acid and glycol and have hitherto been used frequently. For their synthesis, saturated dicarboxylic acids, aromatic dicarboxylic acids, and dicyclopentadiene which reacts with carboxylic acids may also be used together with these two components. Examples of $\alpha,\beta$-unsaturated dicarboxylic acid include maleic acid, fumaric acid, itaconic acid, citraconic acid and anhydrides of these dicarboxylic acids. Examples of dicarboxylic acid which may be used together with such an $\alpha,\beta$-olefinic unsaturated dicarboxylic acid include adipic acid, sebacic acid, succinic acid, gluconic acid, phthalic anhydride, o-phthalic acid, isophthalic acid, terephthalic acid, tetrahydrophthalic acid and tetrachlorophthalic acid. Examples of glycol include alkanediol, oxaalkanediol and diols with ethylene oxide or propylene oxide added to bisphenol-A. In addition, monools and triols may be used. Examples of alkanediol include ethylene glycol, 1,2-propylene glycol, 1,3-propylene glycol, 1,3-butanediol, 1,4-butanediol, neopentyl glycol, 1,5-pentanediol, 1,6-hexanediol and cyclohexanediol. Examples of oxaalkanediol include dioxyethylene glycol and trioxyethylene glycol. Examples of monovalent or trivalent alcohol include octyl alcohol, oleyl alcohol and trimethylol propane. Synthesis of unsaturated polyester usually takes place with heating while water as by-product is removed. Unsaturated polyesters with average molecular weight of 800–4,000 and acid value of 20–60 are generally used in connection with the present invention.

Examples of olefinic unsaturated monomer to be used in connection with the present invention (Component (b)) include vinyl monomers which have been commonly used as diluent or cross-linking agent for the unsaturated polyesters to be used with the present invention (Component (a)). They include aromatic vinyl monomers such as sytrene, p-chlorostyrene and vinyl toluene and acrylic monomers such as acrylic or methacrylic esters, which consist of arcylic or methacrylic acid and alcohol containing 1–18 carbon atoms (for example, acrylic methylester, acrylic butylester, methacrylic methylester or methacrylic butylester). Component "b" is generally used as a diluent for Components (a) and (c) and added at the rate of 20–60% by weight with respect to Component "a" or 55–85% by weight with respect to Component (c).

The aromatic vinyl-conjugated diene block copolymers to be used in connection with the present invention (Component (c)) are themselves known polymers and can be synthesized by block polymerization of an aromatic vinyl monomer such as styrene, chlorostyrene and vinyl toluene and a conjugated diene monomer such as butadiene and isoprene by a known polymerization method. Examples of such block copolymers (Component (c)) include syrene-butadiene block copolymer and styrene-isoprene block copolymer. Copolymers which are preferable for the purpose of the present invention are those of which the molar ratio between vinyl and diene monomers is about 50:50–5:95 and of which the molecular weight is about 30,000–200,000. For 100 weigh parts of the unsaturated polyester (Component (a)), 50–150 weight parts of the copolymer (Component (c)) should be contained.

In addition to the kind of block copolymers described above, use may also be made in connection with the present invention of another kind of block copolymers obtainable by introducing 0.05–5% by weight of carboxyl groups into a block copolymer of the above kind. Block copolymers of such new kind can improve not only compatibility with the unsaturated polyester but the thickening effect of SMC by using magnesium oxide. These block copolymers with carboxyl groups thereinto are also themselves known polymers and can be produced, for example, by copolymerization with acrylic acid. Hydrogenated block copolymers may also be used in connection with the present invention. Examples of commercially available block copolymers of the aforementioned kinds which may be used in connection with the present invention include Krayton DX-1300 (molecular weight =100,000 produced by Shell Oil Company) and Krayton GX-1701.

The peroxy compound to be used in connection with the present invention (Component (d)) is a mixture of t-butylperoxy benzoate, t-butylperoxy octoate and 1,1-bis(t-butylperoxy)3,3,5-trimethyl cyclohexane and their mixing ratio should preferably be 2–5:1 –2:1–2, and more preferably 3.5–5:1–2:1–2. Against 100 weight parts of the combination of Components (a), (b) and (c), 1–5 weight parts of such a peroxy compound should be used.

Examples of organic compounds of cobalt, copper and manganese to be used in connection with the present invention include octoates, naphthenates and acetylacetonates of these metals. They may be used either singly or in combination. They should preferably be added at the rate of about 0.05–3% by weight with respect to the unsaturated polyester.

If necessary, fillers, retarders, pigments and thickeners may be added to the compositions of the present invention. Examples of fillers include calcium carbonate, talc, silica, clay, glass powder and glass balloons. Examples of retarders include parabenzoquinone and t-butyl hydroxytoluene. Examples of pigments include titanium oxide, carbon black, iron oxide red and phthalocyanine blue. Examples of thickeners include oxides and hydroxides of magnesium and calcium.

Sheet and bulk molding compounds can be produced by known methods and by using known apparatus to impregnate glass fibers (for example, of diameter of about 8–20$\mu$ and length ½–4 inches) with these compositions containing such compounding agents of various kinds. Glass fibers are usually provided so as to be about 10–40% by weight of the total composition. Sheet and bulk molding compositions of the present invention are heated and compressed (at pressure of 50–120kgf/cm$^2$ and temperature of 110–180° C.) to produce molded products.

Unsaturated polyester compositions of the present invention are speedily curable and hence have high productivity. Moreover, moldable products therefrom have superior surface smoothness and are extremely useful, for example, for exterior body panels of automobiles. In what follows, results of test examples (1–5) and comparison examples (1–3) are described in detail.

Test Results

Sheet molding compositions were prepared with compositions shown in Table 1 wherein unsaturated polyester resin A was synthesized from propylene glycol and maleic acid. It contained 40% of sytrene, its viscosity at 25° C. was 820cps and its acid value was 16.5. Unsaturated polyester B was synthesized from 0.7mol of propylene glycol, 0.3mol of dicyclopentadiene and 1.0mol of maleic acid anhydride. It contained 45% of styrene, its viscosity at 25° C. was 650cps and its acid value was 21. The styrene-butadiene block copolymer solution consisted of 30 weight parts of copolymer and 70 weight parts of styrene and its viscosity at 25° C. was 28,000cps. The average molecular weight of this copolymer was 120,000 and consisted of 15wt% of styrene and 85wt% of butadiene, having 0.5wt% of carboxyl groups. Each sheet molding composition was compressed under specified conditions with flow time of 9 seconds under a pressure of 80kgf/cm$^2$ to produce a molded product in the shape of a plate (of dimensions 500×1000 ×2mm) as shown in Figure. Surface characteristics of these molded products were examined by a three-dimensional tester (Microcord FJ604 produced by Mitsutoyo, Inc.). Three-dimensional (X, Y, Z) surface smoothness was first measured along the four lines 1, 2, 3 and 4 at 300 points (pitch 1.0mm). fifth-power regression curves were calculated from the Z-values of the individual points to determine the cross-sectional shape and the average deviations ($\mu$) of the individual Z-values from the curves were obtained. Surface roughness was measured along the line 5. The results of these measurements are shown in Table 1. Table 1 clearly teaches that these exemplary products embodying the present invention show low average deviations and surface roughness with compression time of 60 seconds (40 seconds for Example 5) and are unsaturated polyester products with superior surface quality compared to the comparison examples.

TABLE 1

|  | Ex. 1 | Ex. 2 | Ex. 3 | Ex. 4 | Ex. 5 | Comp. 1 | Comp. 2 | Comp. 3 |
| --- | --- | --- | --- | --- | --- | --- | --- | --- |
| (i) Composition (parts by weight) | | | | | | | | |
| Unsaturated polyester A | 50 | 50 | — | 50 | 50 | 50 | 50 | 50 |
| Unsaturated polyester B | — | — | 50 | — | — | — | — | — |
| Block copolymer solution | 50 | 50 | 50 | 50 | 50 | 50 | 50 | 50 |
| Calcium carbonate | 180 | 180 | 180 | 180 | 180 | 180 | 180 | 180 |
| p-Benzoquinone | 0.01 | 0.01 | 0.01 | 0.01 | 0.01 | 0.01 | 0.01 | 0.01 |

TABLE 1-continued

|  | Ex. 1 | Ex. 2 | Ex. 3 | Ex. 4 | Ex. 5 | Comp. 1 | Comp. 2 | Comp. 3 |
|---|---|---|---|---|---|---|---|---|
| t-Butylperoxy benzoate, | 1.0 | 0.8 | 1.0 | 1.0 | 0.8 | 1.5 | — | — |
| t-Butylperoxy octoate and | 0.2 | 0.4 | 0.2 | 0.2 | 0.4 | — | 1.5 | — |
| 1,1-Bis(t-butylperoxy) 3,3,5-trimethyl cyclohexane | 0.3 | 0.3 | 0.3 | 0.3 | 0.3 | — | — | 1.5 |
| Cobalt naphthenate | 0.25 | 0.25 | 0.25 | — | 0.25 | 0.25 | 0.25 | 0.25 |
| Magnesium octoate | — | — | — | 0.15 | — | — | — | — |
| Glass fibers (diameter = 12μ, length = 1 in.) | 110 | 110 | 110 | 110 | 110 | 110 | 110 | 110 |
| Manganese oxide | 1.0 | 1.0 | 1.0 | 1.0 | 1.0 | 1.0 | 1.0 | 1.0 |
| (ii) Gelation time of SMC (sec) | 37 | 33 | 37 | 28 | 33 | 48 | 25 | 37 |
| (iii) Molding conditions |  |  |  |  |  |  |  |  |
| Temperature (°C.)/compression time (sec) | 150/60 | 150/60 | 150/60 | 150/60 | 155/40 | 150/60 | 150/60 | 150/60 |
| (iv) Surface quality |  |  |  |  |  |  |  |  |
| Average deviation from 5th-power regression curve (μ) | 2.5 | 3.8 | 2.9 | 3.1 | 3.2 | 10.5 | 8.1 | 9.0 |
| Surface roughness (μ) | 1.0 | 1.5 | 1.2 | 1.4 | 1.7 | 3.5 | 4.3 | 3.5 |

What is claimed is:

1. A quickly curable unsaturated polyester composition with high surface quality, comprising
   an unsaturated polyester,
   an olefinic unsaturated monomer,
   50–150 weight parts of an aromatic vinyl-conjugated diene block copolymer or a hydrogenated aromatic vinyl-conjugated diene block copolymer per 100 weight parts of said unsaturated polyester,
   1–5 weight parts of a mixture of t-butylperoxy benzoate, t-butylperoxy octoate and 1,1-bis(t-butylperoxy) 3,3,5-trimethyl cyclohexane per 100 weight parts of said unsaturated polyester, unsaturated monomer and block copolymer, and
   at least one selected from organic compounds of cobalt, copper and manganese.

2. The composition of claim 1 wherein said block copolymer contains 0.05–5% of carboxyl groups by weight.

3. The composition of claim 1 wherein the mixing ratio of said mixture is 3–5:1–2:1–2.

4. The composition of claim 1 further comprising 10–40% of glass fibers by weight with respect to the total weight of said composition.

5. The composition of claim 4 which is sheet-shaped.

6. The composition of claim 4 which is bulk-shaped.

7. A molded product characterized as being obtainable by curing an unsaturated polyester composition which comprises
   an unsaturated polyester,
   an olefinic unsaturated monomer,
   50–150 weight parts of an aromatic vinyl-conjugated diene block copolymer or a hydrogenated aromatic vinyl-conjugated diene block copolymer per 100 weight parts of said unsaturated polyester,
   1–5 weight parts of a mixture of t-butylperoxy benzoate, t-butylperoxy octoate and 1,1-bis(t-butylperoxy) 3,3,5-trimethyl cyclohexane per 100 weight parts of said unsaturated polyester, unsaturated monomer and block copolymer, and
   at least one selected from organic compounds of cobalt, copper and manganese.

8. The molded product of claim 7 wherein said block copolymer contains 0.05–5% of carboxyl groups by weight.

9. The molded product of claim 7 wherein the mixing ratio of said mixture is 3–5:1–2:1–2.

10. The molded product of claim 7 wherein said composition further includes 10–40% of glass fibers by weight with respect to the total weight of said composition.

* * * * *